United States Patent
Lee et al.

(10) Patent No.: US 12,494,558 B2
(45) Date of Patent: Dec. 9, 2025

(54) BATTERY MODULE, ENERGY STORAGE DEVICE, AND FUSE SETTING METHOD

(71) Applicant: LG ENERGY SOLUTION, LTD., Seoul (KR)

(72) Inventors: Chang Bog Lee, Daejeon (KR); Sung Il Moon, Daejeon (KR); Hyeon Jin Song, Daejeon (KR); Min Kyu Kim, Daejeon (KR); Sol Ji Yoo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 530 days.

(21) Appl. No.: 17/792,072

(22) PCT Filed: Apr. 5, 2021

(86) PCT No.: PCT/KR2021/004216
§ 371 (c)(1),
(2) Date: Jul. 11, 2022

(87) PCT Pub. No.: WO2021/215698
PCT Pub. Date: Oct. 28, 2021

(65) Prior Publication Data
US 2023/0053313 A1    Feb. 16, 2023

(30) Foreign Application Priority Data

Apr. 20, 2020   (KR) .................. 10-2020-0047727

(51) Int. Cl.
*H01M 50/583*    (2021.01)
*H01M 10/44*    (2006.01)
*H01M 50/204*    (2021.01)

(52) U.S. Cl.
CPC ....... *H01M 50/583* (2021.01); *H01M 10/441* (2013.01); *H01M 50/204* (2021.01); *H01M 2200/103* (2013.01)

(58) Field of Classification Search
CPC .................................................. H01M 50/583
See application file for complete search history.

(56) References Cited

U.S. PATENT DOCUMENTS

| | | | |
|---|---|---|---|
| 2008/0084180 A1* | 4/2008 | Hasegawa | H01M 50/583 320/112 |
| 2013/0143101 A1 | 6/2013 | Nakagawa et al. | |

(Continued)

FOREIGN PATENT DOCUMENTS

| | | |
|---|---|---|
| CN | 103367689 A | 10/2013 |
| JP | 2011-243382 A | 12/2011 |

(Continued)

OTHER PUBLICATIONS

Clarivate Analytics machine translation of KR 10-2019-0018378 A (Year: 2019).*

(Continued)

*Primary Examiner* — Kevin E Yoon
(74) *Attorney, Agent, or Firm* — Birch, Stewart, Kolasch & Birch, LLP

(57) ABSTRACT

A battery module in an energy storage device used with a plurality of battery modules in a battery rack and including a rack fuse that cuts off a circuit when an overcurrent occurs includes a battery cell and a module fuse for cutting off a circuit when overcurrent occurs, the module fuse starts to melt later than a melting completion time point of the rack fuse.

13 Claims, 4 Drawing Sheets

(56) References Cited

U.S. PATENT DOCUMENTS

| | | | |
|---|---|---|---|
| 2013/0260191 A1* | 10/2013 | Takahashi | H01M 10/4257 429/61 |
| 2013/0260196 A1 | 10/2013 | Takahashi et al. | |
| 2014/0210414 A1* | 7/2014 | Kamata | H01M 10/441 320/118 |
| 2021/0210826 A1 | 7/2021 | Quima et al. | |
| 2021/0367440 A1 | 11/2021 | Han et al. | |
| 2021/0376592 A1 | 12/2021 | Nakajima | |
| 2022/0399619 A1* | 12/2022 | Lee | H02J 7/0031 |

FOREIGN PATENT DOCUMENTS

| | | |
|---|---|---|
| JP | 4942438 B2 | 5/2012 |
| JP | 2013-206642 A | 10/2013 |
| JP | 2013-207876 A | 10/2013 |
| JP | 2013-210333 A | 10/2013 |
| JP | 2015-22959 A | 2/2015 |
| JP | 2017-158268 A | 9/2017 |
| JP | 2019-22359 A | 2/2019 |
| JP | 6488631 B2 | 3/2019 |
| JP | 2019-68489 A | 4/2019 |
| JP | 6497257 B2 | 4/2019 |
| JP | 2020-57492 A | 4/2020 |
| JP | 2012-150902 A | 9/2025 |
| KR | 10-2004-0108177 A | 12/2004 |
| KR | 10-1222334 B1 | 1/2013 |
| KR | 10-2014-0028349 A | 3/2014 |
| KR | 10-2018-0000232 A | 1/2018 |
| KR | 1020180087012 A * | 8/2018 ............ H01M 10/48 |
| KR | 10-2019-0018378 A | 2/2019 |
| KR | 10-2011736 B1 | 8/2019 |
| KR | 10-2020-0000990 A | 1/2020 |
| WO | WO 2019/244412 A1 | 12/2019 |

OTHER PUBLICATIONS

Clarivate Analytics machine translation of KR 10-2011736 (Year: 2019).*

International Search Report (PCT/ISA/210) issued in PCT/KR2021/004216, dated Jul. 23, 2021.

Extended European Search Report for European Application No. 21793093.2, dated Apr. 4, 2023.

* cited by examiner

| ESS system | RACK Fuse | | | | MODULE Fuse | | | | I2t STANDARD MATCHING DEGREE |
|---|---|---|---|---|---|---|---|---|---|
| | MODEL | VOLTAGE | CURRENT | $I2t * 1.2(A^2s)^{1)}$ | MODEL | VOLTAGE | CURRENT | $I2t(A^2s)^{2)}$ | |
| 1,000 VDC 230 A | A | 1,000 | 250 | 30,852 | D | 120 | 400 | 27,456 | INAPPROPRIATE |
| | A | 1,000 | 250 | 30,852 | E | 120 | 450 | 34,488 | APPROPRIATE |
| 1,000 VDC 320 A | B | 1,000 | 315 | 41,742 | E | 120 | 450 | 34,488 | INAPPROPRIATE |
| | B | 1,000 | 315 | 41,742 | F | 120 | 500 | 48,931 | APPROPRIATE |
| | C | 1,000 | 350 | 62,064 | F | 120 | 500 | 48,931 | INAPPROPRIATE |
| | C | 1,000 | 350 | 62,064 | G | 120 | 600 | 78,234 | APPROPRIATE |

1) Total Clearing
2) Melt Starting

Fig.4

BATTERY MODULE, ENERGY STORAGE DEVICE, AND FUSE SETTING METHOD

TECHNICAL FIELD

Cross-Reference to Related Applications

This application claims the benefit of Korean Patent Application No. 10-2020-0047727 filed on Apr. 20, 2020, in the Korean Intellectual Property Office, the disclosure of which is incorporated herein in its entirety by reference.

TECHNICAL FIELD

Embodiments of the present invention relate to a battery module, an energy storage device, and a fuse setting method, and more particularly, to a battery module and an energy storage device in which a fuse for cutting off overcurrent is installed, and a fuse setting method.

BACKGROUND ART

Recently, with the spread of electronic devices such as smartphones and electric vehicles, and the spread of infrastructure for Energy Storage System (ESS), research on secondary batteries as a power supply source has been actively conducted.

In the case of ESS, large amounts of electric energy are necessary to be stored, and also high power is required. Accordingly, in the ESS, the secondary battery is provided in the form of a battery rack including a plurality of battery modules and a rack controller that manages the plurality of battery modules. Each of the plurality of battery modules further includes a battery pack in which a plurality of battery cells are connected in series and/or in parallel, and a module controller that manages the operation of the battery pack.

Since a short circuit in the ESS can lead to a major accident such as a fire, various configurations are provided to cut off such a short circuit for safety. Currently, a fuse as a passive element is connected in a battery system such as an ESS. When a short circuit occurs, the overcurrent is cut off in a short moment through a fuse to prepare for a short circuit accident.

The fuse in the battery rack has a structure that cannot cope with a short circuit at the module level. Therefore, a module fuse is also provided in the battery system to satisfy the UN Transportation Testing (UN/DOT 38.3) standard. UN/DOT 38.3 is a test regulation to ensure safety in transportation of lithium-ion batteries. UN/DOT 38.3 contains the content that protection against short circuits of the module is required when the battery is transported in a module state, and a module fuse is provided to satisfy this. In relation to the module fuse, a fuse having a voltage specification that satisfies the module voltage is selected so that there is no problem in the short-circuit test of the installed battery module.

However, in the case where a short circuit occurs in the battery rack after the battery module is finally mounted in the battery rack, if the module fuse operates before the rack fuse and is melted, there is a possibility that the system voltage, that is, the output voltage of the battery rack, will be caught by the module fuse. In this case, the module fuse cannot withstand the system voltage and may be damaged and other components may also be damaged.

DISCLOSURE OF THE INVENTION

Technical Problem

Embodiments of the present invention have been made to solve the above problems, and an object thereof is to provide a battery module, an energy storage device, and a fuse setting method that are safe and have price competitiveness.

Technical Solution

In order to solve the above technical problem, according to an aspect of the embodiments of the present invention, a battery module in an energy storage device used with a plurality of battery modules in a battery rack and including a rack fuse that cuts off a circuit when an overcurrent occurs includes: a battery cell; and a module fuse configured to cut off a circuit of the battery module when overcurrent occurs, and wherein the module fuse is configured to start to melt later than a melting completion time point of the rack fuse.

According to another feature of this embodiment, a value of I2t until the module fuse starts to melt may be greater than a value of I2t until the rack fuse is melted completely, I2t representing a magnitude of thermal energy generated by a flow of current through the respective fuse among the module fuse and the rack fuse.

According to another feature of this embodiment, the value of I2t until the module fuse starts to melt may be greater than a value obtained by multiplying the value of I2t until the rack fuse is melted completely by a predetermined ratio.

According to another feature of this embodiment, a rate of change of resistance after the rack fuse is melted completely may be less than a reference value in the module fuse.

According to another feature of this embodiment, the module fuse may have a voltage specification corresponding to an output voltage of the battery module.

According to another feature of this embodiment, the voltage specification of the module fuse may be lower than a voltage specification of the rack fuse.

According to another feature of this embodiment, a short circuit specification of the module fuse may be lower than a short circuit specification of the rack fuse.

In order to solve the above technical problem, according to another aspect of the embodiments of the present invention, an energy storage device includes: a battery rack including a plurality of battery modules; and a rack fuse configured to cut off a circuit of the energy storage device when an overcurrent occurs in the battery rack, wherein each of the plurality of battery modules includes a battery cell and a module fuse configured to cut off a circuit when an overcurrent occurs in the battery module, wherein the module fuse is configured to start to melt later than a melting completion time point of the rack fuse.

According to another feature of this embodiment, a value of I2t until the module fuse starts to melt may be greater than a value of I2t until the rack fuse is melted completely, I2t representing a magnitude of thermal energy generated by a flow of current through the respective fuse among the module fuse and the rack fuse.

According to another feature of this embodiment, a rate of change of resistance after the rack fuse is melted completely may be less than a reference value in the module fuse.

In order to solve the above technical problem, according to another aspect of the embodiments of the present invention, a method for producing an energy storage device includes providing a plurality of battery modules, providing a module fuse for each of the plurality of battery modules, and providing a rack fuse for each of the plurality of battery modules, each rack fuse is configured to cut off a circuit of the energy storage device when an overcurrent occurs, and each module fuse starts to melt later than a melting completion time point of a respective rack fuse for a respective one of the plurality of battery modules.

According to another feature of this embodiment, a value of I2t until each module fuse starts to melt may be greater than a value of I2t until the respective rack fuse is melted completely, I2t representing a magnitude of thermal energy generated by a flow of current through the respective fuse among the module fuses and the rack fuses.

According to another feature of this embodiment, a rate of change of resistance after each rack fuse is melted completely may be less than a reference value in the respective module fuse.

Effects of the Invention

Due to the above configuration, it is possible to provide a battery module, an energy storage device, and a fuse setting method that are safe and have price competitiveness.

BRIEF DESCRIPTION OF THE DRAWINGS

FIG. 4 is a view for explaining a method of selecting a module fuse and a rack fuse according to an embodiment of the present invention.

MODE FOR CARRYING OUT THE INVENTION

Figure 1:
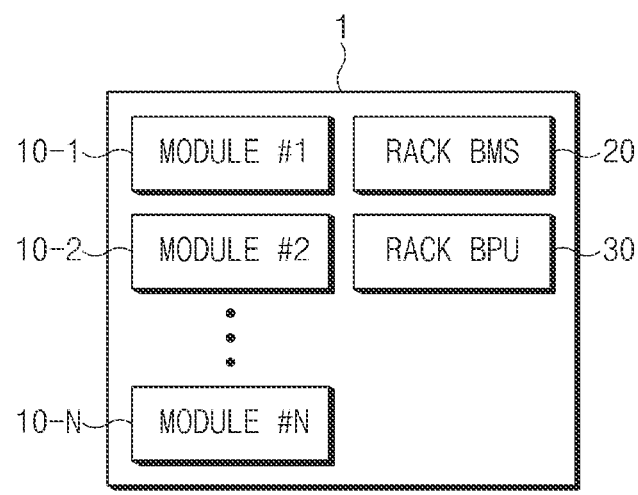
FIG. 1 is a diagram showing the configuration of an energy storage device according to an embodiment of the present invention.

Hereinafter, various embodiments of the present invention will be described in detail with reference to the accompanying drawings. In this document, the same reference numerals are used for the same components in the drawings, and duplicate descriptions of the same components are omitted.

For the various embodiments of the present invention disclosed in this document, specific structural or functional descriptions have been exemplified for the purpose of describing the embodiments of the present invention only and various embodiments of the present invention may be implemented in various forms and should not be construed as being limited to the embodiments described in this document.

Expressions such as "first", "second", "first", or "second" used in various embodiments may modify various elements regardless of their order and/or importance, and do not limit the corresponding elements. For example, without departing from the scope of the present invention, a first component may be referred to as a second component, and similarly, a second component may be renamed and referred to as a first component.

Terms used in this document are only used to describe a specific embodiment, and may not be intended to limit the scope of other embodiments. The terms of a singular form may include plural forms unless otherwise specified.

FIG. 1 is a diagram showing the configuration of an energy storage device according to an embodiment of the present invention.

Referring to FIG. 1, an energy storage device 1 is a unit that stores energy in an energy storage system. The energy storage system may be configured including a plurality of energy storage devices 1. The energy storage device 1 is provided in the form of a battery rack. The battery rack is equipped with a plurality of battery modules 10 and a rack controller that controls the entire battery rack at the chassis. Hereinafter, an energy storage device and a battery rack may be used in combination.

The energy storage device 1 may include a battery module made of a rechargeable and dischargeable secondary battery. The energy storage device 1 may supply stored power to a load or to a system. In addition, the energy storage device 1 may be charged by receiving power from the system.

As shown in FIG. 1, the energy storage device 1 may include a plurality of battery modules 10-1 to 10-N, a rack controller (Rack Battery Management System (RBMS)), and a Rack Battery Protection unit (RBPU), and the like.

The plurality of battery modules 10-1 to 10-N are unit components that can be mounted on the energy storage device 1, and each of the plurality of battery modules 10-1 to 10-N is configured to charge and discharge power. (In the following, when there is no need to separate and describe a plurality of battery modules, reference numerals will be described as 'battery module 10'.) The battery module 10 is a component that can be transported by itself before being assembled into a battery rack as the energy storage device 1. The plurality of battery modules 10 may be connected in series and/or parallel to each other within the energy storage device 1 according to the required specifications of the energy storage device 1. That is, the plurality of battery modules 10 may provide a required output according to a series and/or parallel connection configuration.

Figure 2:
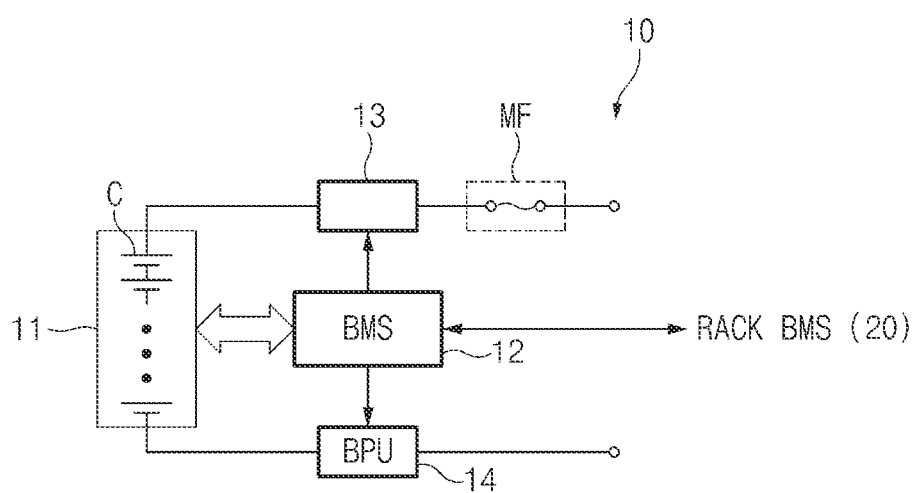
FIG. 2 is a diagram showing the configuration of a battery module according to an embodiment of the present invention.

Each of the battery modules 10 may include a battery pack 11, a module controller 12, a switching unit 13, and a module BPU 14. FIG. 2 is a diagram showing the configuration of a battery module according to an embodiment of the present invention.

Referring to FIG. 2, the battery pack 11 may include one or more battery cells C, which are unit components for storing power. A plurality of battery cells may be connected in series and/or parallel to each other according to the required specifications of the battery pack 11. That is, the number and connection type of the battery cells C may be determined according to the required output (voltage, current, etc.) of the battery module 10. The battery cell C may be a lithium ion (Li-ion) battery, a lithium ion polymer (Li-ion polymer) battery, a nickel cadmium (Ni—Cd) battery, a nickel hydrogen (Ni-MH) battery, and the like. If it is a rechargeable battery, it is not limited thereto.

The module controller 12 (or "module BMS") controls and manages the overall operation of the battery module 10. The module controller 12 may detect the temperature of the battery module 10 and the voltage and current output from the battery module 10. The battery module 10 may calculate parameters such as SOC, that is, a charged state, or SOH indicating a degree of deterioration from values such as temperature, voltage, and current detected through direct measurement or reception from the outside. For detection of voltage, current, temperature, and the like, the module controller 12 may provide a measuring means such as a sensor at an appropriate position in the battery module 10 or the energy storage device 1.

The module controller 12 may transmit values such as temperature, voltage, and current, or calculated values such as SOC and SOH, to an external device. The external device may be an upper-level controller, and in this embodiment, may transmit values such as detected temperature, voltage, current, and the like, or values such as calculated SOC and SOH, and the like to the rack controller 20 that manages the energy storage device 1.

The module controller 12 may execute a computer program to control and manage the overall operation of the battery module 10 and may include various components such as a microcomputer as a controller for controlling the entire operation of the module controller 12, a memory for storing a computer program required for the operation of the module controller 12, an input/output device such as sensors and measuring means, a communication device for communicating with an external device, and other peripheral circuits.

The switching unit 13 may be a device that supplies power to a system or a load or receives power from a system when charging or discharging the battery module 10. The switching unit 13 may be a relay or a contactor. The operation of the switching unit 13 may be controlled by the module controller 12.

The module BPU 14 may include components for stable operation of the battery module 10. The module BPU 14 may include cooling means such as a cooling fan for controlling the temperature in the battery module 10. In addition, the module BPU 14 may include a module fuse MF for cutting off a current path when an overcurrent occurs due to a short circuit or the like. That is, the battery module 10 may include a module fuse MF that cuts off a circuit when an overcurrent occurs.

When an overcurrent flows through the battery module 10, the module fuse MF is melted by heat generated by electric energy. When the module fuse MF is melted to cut off the flow of current, a predetermined voltage is applied therebetween. In addition, the module fuse MF must be able to withstand a predetermined voltage applied to both ends after melting. Specific specifications and characteristics of the module fuse MF will be described later.

The rack controller 20 may control a relay for charging to a battery rack or discharging from a battery rack to a system or a load. The rack controller 20 may monitor various parameters (e.g., voltage, current, temperature, etc.) in the battery rack and control each protection means in the rack BPU 30 based on the result.

The rack controller 20 may communicate with the module controller 12 included in each of the plurality of battery modules 10 included in the battery rack. The rack controller 20 may receive data on the state of the battery pack 11 from the module controller 12 and control protection means in the rack BPU 30 based thereon. In addition, the rack controller 20 may transmit a control signal for controlling the operation of the battery module 10 to the module controller 12 based on data from the module controller 12. The rack controller 20 may communicate with the plurality of module controllers 12 by wire and/or wirelessly.

Like the module BPU 14, the rack BPU 30 may include components for stable operation of the battery rack. The rack BPU 30 may include cooling means such as a cooling fan for controlling the temperature in the battery rack. In addition, the rack BPU 30 may include a rack fuse RF for cutting off a current path when an overcurrent occurs due to a short circuit or the like. That is, the energy storage device 1 may include a rack fuse RF that cuts off a circuit when an overcurrent occurs in the battery rack. Specific specifications and characteristics of the rack fuse (RF) will be described later.

Figure 3:
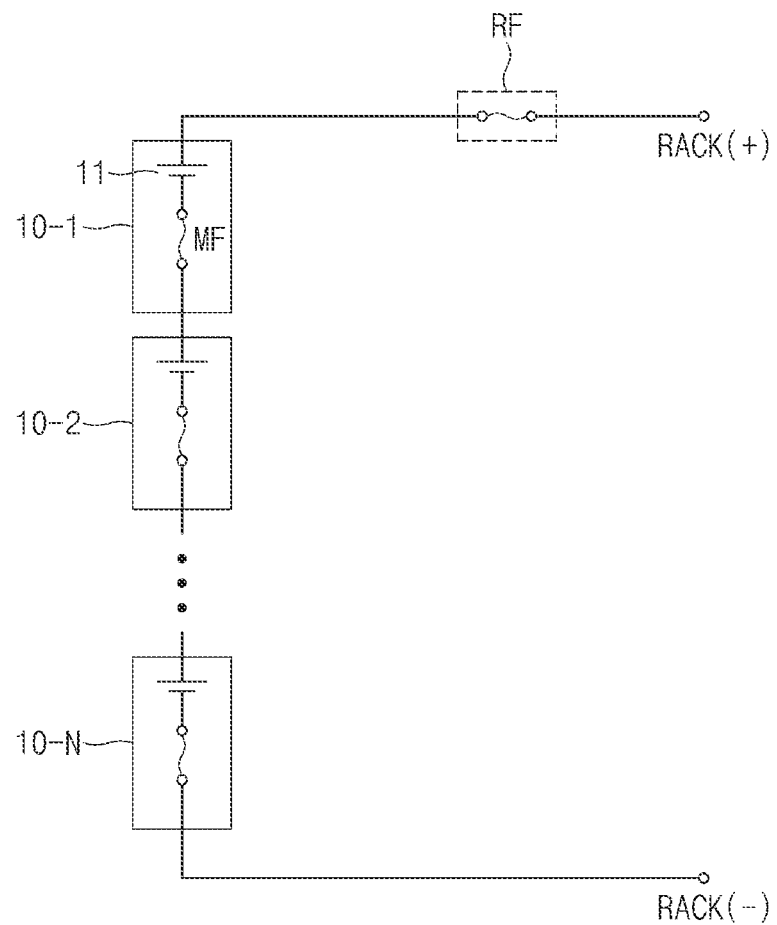
FIG. 3 is a schematic circuit diagram of an energy storage device according to an embodiment of the present invention.

In the energy storage device 1 configured as described above, at least some of the plurality of battery modules 10 and the rack fuse RF are connected in series with each other. FIG. 3 is a schematic circuit diagram of an energy storage device 1 according to an embodiment of the present invention.

Referring to FIG. 3, at least some of the battery modules 10-1 to 10-N among the plurality of battery modules 10 are connected in series with each other, and the rack fuse RF is connected in series to the battery modules 10-1 to 10-N connected in series. RACK(+) and RACK(−) represent the output terminals of the battery rack. In FIG. 3, for convenience of explanation, only one battery cell is illustrated as the battery pack 11, and only the battery pack 11 and the module fuse MF are illustrated.

In the energy storage device 1 configured as shown in FIG. 3, a case where a short circuit occurs in the battery rack or a case where a short circuit occurs in the battery module 10 may be assumed.

Conventionally, a fuse having a specification capable of withstanding the output voltage of a battery module was used as a module fuse in order to satisfy the UN/DOT 3.83 regulations. For example, in the case of a battery module that outputs a voltage of about 50 VDC to about 100 VDC, a fuse capable of withstanding a voltage of about 120 VDC to about 150 VDC was used. However, such a module fuse uses a commercial product, and the fuse used has a short circuit specification capable of passing a current of about 20 kA.

However, in the case of a conventionally used module fuse, it was possible to protect the battery module against module short circuits that occur when the battery modules are individually used or transported, but there is a problem in that the battery module cannot be protected against a rack short circuit that occurs while a plurality of battery modules are mounted on the battery rack. Especially when a short circuit occurs in the battery rack, if the module fuse melts before the rack fuse, because the system voltage is applied to the battery module and a voltage exceeding the specification of the module fuse is applied, there is a risk of damage to parts.

Therefore, there is a need for a method to protect the battery module not only when the battery module is used individually, but also when it is mounted in a battery rack. Also, as the specification of the fuse increases, the volume and price increase. Therefore, it should be considered that the energy density does not decrease due to the volume without deteriorating the price competitiveness of the battery module.

In order to solve the above problems, according to an embodiment of the present invention, the module fuse MF is configured to melt later than the rack fuse RF. More specifically, the module fuse MF and the rack fuse RF are set so that the module fuse MF starts to melt later than the melting completion time point of the rack fuse RF by measuring the I2t energy. I2t represents the magnitude of thermal energy generated by the flow of current through the fuse (conductor), and is a value determined according to the magnitude and time of the flowing current. The above condition can be satisfied by making the value of I2t until the start of melting of the module fuse MF is larger than the value of I2t until the completion of the melting of the rack fuse RF. In other words, the above condition can be satisfied by making the value of I2t until the completion of the melting of the rack fuse RF is smaller than the value of I2t until the start of the melting of the module fuse MF.

Preferably, in order to ensure that the rack fuse RF is surely melted before the module fuse MF starts to melt, the value of I2t until the start of melting of the module fuse MF may be set to be larger than a value obtained by multiplying the value of I2t until the completion of the melting of the rack fuse RF by a predetermined ratio. Here, the predetermined ratio will be 1.2, for example, if there is a margin of about 20%.

If the module fuse MF is selected first, the rack fuse RF is selected accordingly. Conversely, when the rack fuse RF is selected first, the module fuse MF is selected accordingly. Accordingly, the module fuse MF and the rack fuse RF may include various combinations satisfying the above condition.

FIG. 4 is a view for explaining a method of selecting a module fuse MF and a rack fuse RF according to an embodiment of the present invention. In FIG. 4, a test was conducted with a combination of various module fuses MF and rack fuses RF, and the applied energy storage device 1 has two specifications, that is, 1,000 VDC and 230 A, and 1,000 VDC and 320 A. As the rack fuse RF, component A with voltage specifications and short circuit specifications of 1,000 VDC and 230 A, respectively, component B with voltage specifications and short circuit specifications of 1,000 VDC and 315 A, respectively, and component C with voltage specifications and short circuit specifications of 1,000 VDC and 350 A, respectively, were used. In addition, as the module fuse MF, component D with voltage specifications and short circuit specifications of 120 VDC and 400 A, respectively, component E with voltage specifications and short circuit specifications of 120 VDC and 450 A, respectively, component F with voltage specifications and short circuit specifications of 120 VDC and 500 A, respectively, and component G with voltage specifications and short circuit specifications of 120 VDC and 600 A, respectively, were used.

As shown in FIG. 4, when the combination of the rack fuse RF-module fuse MF is component A-component E, component B-component F, component C-component G, it was measured that the value of I2t*1.2 of the rack fuse RF is smaller than the value of I2t of the module fuse MF. Here, in the value of I2t in the rack fuse RF, t is the time until the rack fuse RF is completely melted (Total Clearing). In the value of I2t in the module fuse MF, t is the time until the module fuse MF starts to melt. Therefore, in the case of the above three combinations, it was determined to be a suitable combination for use as the rack fuse RF and the module fuse MF.

In the case of the other component combinations of FIG. 4, the value of I2t*1.2 of the rack fuse RF was measured to be greater than the value of I2t of the module fuse MF, and thus it was determined that the combination was unsuitable for use. In the case of the component A-component E combination, the I2t value of the rack fuse RF was measured to be smaller than the I2t value of the module fuse MF, but since the difference is small, there is a possibility that the module fuse MF will melt first in some cases. Therefore, as described above, the suitability was determined by comparing with a value multiplied by a predetermined ratio of 1.2.

By setting the module fuse MF and the rack fuse RF as described above, when a battery rack short circuit occurs, the rack fuse RF is always first melted and the circuit is cut off. Therefore, the module fuse MF does not need to have a specification capable of withstanding the system voltage in preparation for a short circuit in the battery rack. That is, it is sufficient that the module fuse MF has a voltage specification capable of corresponding to the output voltage of the battery module 10. The module fuse MF may have a voltage specification lower than that of the rack fuse RF. In addition, the module fuse MF may have a specification lower than that of the rack fuse RF in the same manner with respect to the short circuit specification. The module fuse MF only needs to correspond to the output voltage of the battery module 10 that is much lower than the system voltage, and may have a low short-circuit specification, so that unnecessary cost and volume increase can be suppressed.

Meanwhile, in order to solve the above problem, according to another embodiment of the present invention, the rate of change in resistance of the module fuse MF before and after melting of the rack fuse RF is less than a reference value. In a case where the resistance of the module fuse MF does not change even if the rack fuse RF melts due to an overcurrent caused by a rack short circuit, it may be determined that the module fuse MF is not affected by the overcurrent. In this case, since the resistance of the module fuse MF is changed below the reference value, there is no need for component replacement when repairing due to a rack short circuit, so that unnecessary cost can be suppressed.

If the module fuse MF is selected first, the rack fuse RF is selected accordingly. Conversely, when the rack fuse RF is selected first, the module fuse MF is selected accordingly. Accordingly, the module fuse MF and the rack fuse RF may include various combinations satisfying the above condition.

When the rack fuse RF is simulated so that the rack fuse RF melts first by a combination of the rack fuse RF and the module fuse MF used in the test of FIG. 4, in the case of a combination of component A-component E, component D-component E, component B-component F, and component C-component G, it was measured that the rate of change in resistance of the module fuse MF measured before and after the melting of the rack fuse RF was less than a predetermined value. Therefore, in the case of the above four combinations, it was determined to be a suitable combination for use as the rack fuse RF and the module fuse MF. Here, the reference value of the resistance change rate was set to 2%. However, the reference value of the resistance change rate is a changeable value, and may be appropriately selected as necessary, such as 3%, 5% or 10%.

In the case of the remaining component combinations of FIG. 4, that is, component A-component D and component C-component F, the rate of change in resistance of the module fuse MF before and after the melting of the rack fuse RF became more than the reference value. It can be seen that the module fuse MF started to melt before the rack fuse RF melted, and therefore, in some cases, the module fuse MF first melts when the rack is short-circuited.

By setting the module fuse MF and the rack fuse RF as described above, the same effect as in FIG. 4 can be achieved. In addition, the resistance of the module fuse MF hardly changes even when the rack fuse RF is melted and replaced so that as component replacement is not required, unnecessary cost can be suppressed.

Additionally, as another embodiment of the present invention, the module fuse MF and the rack fuse RF may be selected to satisfy both the conditions for the setting method of the module fuse MF and the rack fuse RF used in FIG. 4, and the conditions for the setting method of the module fuse MF and the rack fuse RF so that the resistance change rate of the module fuse MF before and after the melting of the rack fuse RF is less than the reference value. In this case, by selecting and installing more appropriate module fuse MF and rack fuse RF according to the specifications of the energy storage device 1, safety may be further improved.

Terms such as "include", "consist of" or "have" described above mean that the corresponding constituent components can be present unless otherwise stated, and it should be construed that other components may be further included rather than excluding other components. All terms including technical or scientific terms may be interpreted as having the same meaning as commonly understood by one of ordinary skill in the art, unless otherwise defined. Terms commonly used, such as terms defined in the dictionary, should be interpreted as being consistent with the meaning of the context of the related technology, and unless explicitly defined in the present invention, they are not interpreted in an ideal or excessively formal sense.

The above description is merely illustrative of the technical idea of the present invention, and those of ordinary skill in the art to which the present invention pertains will be able to make various modifications and variations without departing from the essential characteristics of the present invention. Therefore, the embodiments disclosed in the present invention are not intended to limit the technical idea of the present invention, but to explain, and the scope of the technical idea of the present invention is not limited by these embodiments. The scope of protection of the present invention should be interpreted by the claims below, and all technical ideas within the scope equivalent thereto should be construed as being included in the scope of the present invention.

The invention claimed is:

1. A battery module in an energy storage device used with a battery rack and including a rack fuse that cuts off a circuit when an overcurrent occurs, the battery module comprising:
   a battery pack including a battery cell;
   a switching unit configured to control a charging or discharging of the battery cell;
   a controller configured to control the switching unit;
   a battery protection unit configured to maintain a stable operation of the battery module; and
   a first module fuse configured to cut off a circuit of the battery module when overcurrent occurs,
   wherein the first module fuse is configured to start to melt later than a melting completion time point of the rack fuse,
   wherein the switching unit is located between the battery cell and the first module fuse,
   wherein the battery protection unit includes a second module fuse located outside of the battery pack, the second module fuse being configured to cut off the circuit of the battery module when the overcurrent occurs, and
   wherein the controller is connected to a wire having a first end connected to the controller and a second end connected to the second module fuse located outside the battery pack and the controller is not directly connected to the first module fuse.

2. The battery module of claim 1, wherein the battery module receives a thermal energy to start melting of the first module fuse that is greater than a thermal energy needed to completely melt the rack fuse.

3. The battery module of claim 2, wherein the thermal energy to start melting of the first module fuse is greater than the thermal energy needed to completely melt the rack fuse by a predetermined ratio.

4. The battery module of claim 1, wherein the battery module includes a rate of change of resistance after the rack fuse is melted completely that is less than a reference value in the first module fuse.

5. The battery module of claim 1, wherein the first module fuse has a voltage specification corresponding to an output voltage of the battery module.

6. The battery module of claim 5, wherein the battery module includes the voltage specification of the first module fuse that is lower than a voltage specification of the rack fuse.

7. The battery module of claim 1, wherein the battery module includes a short circuit specification of the first module fuse that is lower than a short circuit specification of the rack fuse.

8. The battery module of claim 1, wherein the battery protection unit further includes a cooling fan configured to control a temperature of the battery module.

9. The battery module of claim 1, wherein the switching unit and the first module fuse are located on a first line connected to a first end of the battery cell, and
   wherein the battery protection unit is located on a second line connected to a second end of the battery cell.

10. A battery module comprising:
    a battery pack including a battery cell;
    a first module fuse configured to cut off a circuit of the battery module when overcurrent occurs;
    a switching unit located between the first module fuse and a first end of the battery pack;
    a controller configured to control the switching unit to control a charging or discharging of the battery cell; and
    a battery protection unit located at a second end of the battery pack outside of the battery pack, the battery protection unit including a second module fuse configured to cut off the circuit of the battery module when the overcurrent occurs,
    wherein the controller is connected to a wire having a first end connected to the controller and a second end connected to the second module fuse and the controller is not directly connected to the first module fuse.

11. The battery module of claim 10, wherein the battery protection unit further includes a cooling fan configured to control a temperature of the battery module.

12. The battery module of claim 10, wherein the first module fuse has a voltage specification corresponding to an output voltage of the battery module.

13. The battery module of claim 10, wherein the switching unit includes a relay or a contactor.

* * * * *